US008649686B1

(12) United States Patent
Booth

(10) Patent No.: US 8,649,686 B1
(45) Date of Patent: Feb. 11, 2014

(54) SYSTEM AND METHOD FOR CLOSED-LOOP OPTICAL NETWORK POWER BACKOFF

(75) Inventor: Bradley John Booth, Austin, TX (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 216 days.

(21) Appl. No.: 12/954,439

(22) Filed: Nov. 24, 2010

(51) Int. Cl.
*H04B 10/00* (2013.01)
*H04B 1/40* (2006.01)

(52) U.S. Cl.
USPC .............................. 398/162; 398/140; 455/88

(58) Field of Classification Search
USPC .......... 398/140–172, 197, 209, 40; 455/13.4, 455/127.1–127.5, 343.1, 343.2, 571–574, 455/69, 88
See application file for complete search history.

(56) References Cited

U.S. PATENT DOCUMENTS

| | | | |
|---|---|---|---|
| 7,113,667 B2 * | 9/2006 | Welch et al. .................... 385/24 |
| 7,149,424 B2 * | 12/2006 | Kamalov et al. ................ 398/27 |
| 7,574,146 B2 * | 8/2009 | Chiang et al. ................. 398/209 |
| 7,733,964 B2 | 6/2010 | Hsu et al. | |
| 7,760,798 B2 | 7/2010 | Hidaka | |
| 7,804,892 B1 | 9/2010 | Shumarayev et al. | |
| 2004/0203483 A1 * | 10/2004 | Carballo et al. ................ 455/88 |
| 2006/0178121 A1 | 8/2006 | Hamalainen et al. | |
| 2009/0042527 A1 | 2/2009 | Niknejad | |
| 2010/0042865 A1 * | 2/2010 | Creigh .......................... 713/503 |
| 2010/0054323 A1 | 3/2010 | Farjad-rad | |
| 2010/0067474 A1 | 3/2010 | Vijayan et al. | |
| 2010/0103994 A1 * | 4/2010 | Frans et al. ................... 375/221 |
| 2010/0117706 A1 | 5/2010 | Stojanovic et al. | |
| 2010/0283547 A1 | 11/2010 | Dally et al. | |

OTHER PUBLICATIONS

Moore et al, "Optical Network Packet Error Rate Due to Physical Layer Coding", Oct. 2005, Journal of Lightwave Technology, vol. 23, No. 10, pp. 3056-3058.*
Optical Network Packet Error Rate Due to Physical Layer Coding (published by Journal of Lightwave Technology, vol. 23, No. 10, Oct. 2005).*

* cited by examiner

*Primary Examiner* — Leslie Pascal
*Assistant Examiner* — Casey Kretzer

(57) ABSTRACT

In a communication device using a plurality of signal enhancement mechanisms, a system and method are provided for managing signal processing power consumption. A receiver accepts a communications signal and analyzes signal integrity. In response to analyzing the signal integrity, a signal enhancement mechanism is changed, and device power consumption is modified in response to changing the signal enhancement mechanism. In one aspect, the receiver changes a receiver signal enhancement mechanism, and modifies its power consumption. For example, one or more of the following receiver signal enhancement mechanisms may be selected: forward error correction (FEC), equalization, dc voltage level, and physical coding sublayer (PCS).

20 Claims, 7 Drawing Sheets

SYSTEM AND METHOD FOR CLOSED-LOOP OPTICAL NETWORK POWER BACKOFF

BACKGROUND OF THE INVENTION

1. Field of the Invention

This invention generally relates to communication systems and, more particularly, to a system and method for adjusting signal enhancement mechanisms on the receiver and transmitter ends of a link to ensure communications while minimizing power consumption.

2. Description of the Related Art

As noted in Wikipedia, forward error correction (FEC) or channel coding is a system of error control for data transmission, whereby the sender adds systematically generated redundant data to its messages, also known as an error-correcting code. A carefully designed redundancy permits the receiver to detect and correct a limited number of errors occurring anywhere in the message without the need to ask the sender for additional data. FEC gives the receiver an ability to correct errors without needing a reverse channel to request retransmission of data, but this advantage is at the cost of a fixed higher forward channel bandwidth. FEC is therefore applied in situations where retransmissions are relatively costly, or impossible such as when broadcasting to multiple receivers.

FEC processing in a receiver may be applied to a digital bit stream or in the demodulation of a digitally modulated carrier. For the latter, FEC is an integral part of the initial analog-to-digital conversion in the receiver. The Viterbi decoder implements a soft-decision algorithm to demodulate digital data from an analog signal corrupted by noise. Many FEC coders can also generate a bit-error rate (BER) signal which can be used as feedback to fine-tune the analog receiving electronics. The maximum fractions of errors or of missing bits that can be corrected is determined by the design of the FEC code, so different forward error correcting codes are suitable for different conditions.

The two main categories of FEC codes are block codes and convolutional codes. Block codes work on fixed-size blocks (packets) of bits or symbols of predetermined size. Practical block codes can generally be decoded in polynomial time to their block length. Convolutional codes work on bit or symbol streams of arbitrary length. They are most often decoded with the Viterbi algorithm, though other algorithms are sometimes used. Viterbi decoding allows asymptotically optimal decoding efficiency with increasing constraint length of the convolutional code, but at the expense of exponentially increasing complexity. A convolutional code can be turned into a block code, if desired, by "tail-biting".

There are many types of block codes, but among the classical ones the most notable is Reed-Solomon coding because of its widespread use on the Compact disc, the DVD, and in hard disk drives. Golay, BCH, Multidimensional parity, and Hamming codes are other examples of classical block codes. FEC codes may be concatenated for improved performance. Many other related codes are well known in the art.

Signal throughput can also be enhanced using Physical Coding Sublayer (PCS). PCS typically helps to define physical layer specifications for networking protocols like Fast Ethernet, Gigabit Ethernet, and 10 Gigabit Ethernet. The Ethernet PCS sublayer is part of the Ethernet PHY layer (Layer 1). Besides some auto-negotiation, PCS performs 8 binary/10 binary (8B/10B) coding. 8B/10B is a line code that maps 8-bit symbols to 10-bit symbols to achieve dc voltage balance and bounded disparity. For 10 Gigabit Ethernet, PCS is associated with 64B/66B, which is a near dc-balanced waveform. When describing a periodic function in the frequency domain, the dc bias is the mean value of the waveform. A waveform with a zero dc component is known as a dc-balanced waveform. Bit errors can occur when a (relatively) long series of 1's create a dc level that charges the capacitor of the high-pass filter used as the AC coupler, bringing the signal input down incorrectly to a 0-level. In order to avoid these kinds of bit errors, most line codes are designed to produce dc-balanced, or near dc-balanced waveforms. The "cost" of dc balancing is the increase in signal overhead.

In processing electronic audio signals, pre-emphasis (PE) refers to a system process designed to increase, within a band of frequencies, the magnitude of some frequencies with respect to the magnitude of other frequencies in order to improve the overall signal-to-noise ratio—minimizing the adverse effects of such phenomena as attenuation distortion or saturation in subsequent parts of the transmitter or channel.

In high speed digital transmission, pre-emphasis is used to improve signal quality at the output of a data transmission. In transmitting signals at high data rates, the transmission medium may introduce distortions, so pre-emphasis is used to pre-distort the transmitted signal to correct for this distortion. When done properly this produces a received signal which more closely resembles the original or desired signal, producing fewer bit errors. At high data rates, pre-emphasis may include some modification in phase or group delay, as well as amplitude.

At the receiver side, equalization (EQ) can be used to enhance a received signal. Filters, attenuator, or amplifiers can be used to amplify or attenuation signal amplitude in portions of the pass band. Likewise, modifications can be performed upon signal phase and group delay to more accurately recover a signal that has been distorted through the transmission channel. These types of corrections may also be referred to as dispersion compensation.

In the case of electrical circuits, optical-to-electrical, or electrical-to-optical (E/O) conversion, signal enhancement can be often obtained by increasing the direct current (dc) supply voltage powering these circuits. For example, it is well known that CMOS circuitry operating speed improves with an increase in current. Likewise, optical-electrical conversion circuitry such as laser diodes and photodiodes typically perform better at higher dc supply voltages.

Thus, various types of electrical circuitry, optical circuitry, and processing algorithms can be used to improve signal quality or aid in signal recovery. In most cases, this circuitry is used to compensation for poor signal intensity or quality due to long links. Typically, there is no means other than manual intervention or open-loop "trial-and-error" to either turn off unneeded circuitry or to reduce the number of taps in an equalizer.

It would be advantageous if a process existed for modifying the signal enhancement mechanism needed to process a signal, so that a device could minimize power consumption by using only those mechanisms actually required to support communications.

It would be advantageous if the above-disclosed signal enhancement modifications could be performed on both the transmit and receive sides on the link.

SUMMARY OF THE INVENTION

Disclosed herein are system and method to reduce the power consumed, by circuitry involved in the transmission and reception of signals. The operation can be performed by monitoring the intensity of the received optical signal or the error ratio of a converted electrical signal. Then, an in-band signal can be used to communicate the quality of the received signal, between the transmitter and receiver, so that decisions can be made as to what circuitry can be bypassed to reduce power.

There are many instances where the link attenuation is less than the specified maximum. Most instantiations are designed and implemented with the assumption of the maximum reach. By using a closed-loop power backoff, the system can monitor everything from signal light intensity to electrical signal quality and reduce the power consumption; thereby, saving the end user from paying for power that is providing no improved system performance.

Accordingly, in a communication device using a plurality of signal enhancement mechanisms, a method is provided for managing signal processing power consumption. A receiver accepts a communications signal and analyzes signal integrity. In response to analyzing the signal integrity, a signal enhancement mechanism is changed, and device power consumption is modified in response to changing the signal enhancement mechanism. In one aspect, the receiver changes a receiver signal enhancement mechanism, and modifies its power consumption. For example, one or more of the following receiver signal enhancement mechanisms may be selected: forward error correction (FEC), equalization, dc voltage level, and physical coding sublayer (PCS).

The receiver analyzes signal characteristics such as bit error rate (BER), FEC errors, PCS coding errors, signal eye opening, or combinations of the above-mentioned characteristics. In another aspect, the receiver transmits the signal integrity analysis to the transmitter. Then, the transmitter changes a transmitter signal enhancement mechanism and modifies transmitter power consumption. In another variation, both the transmitter and receiver change signal enhancement mechanisms.

Additional details of the above-described method, and receivers and transmitter capable of managing a plurality of signal enhancement mechanisms, are provided below.

DETAILED DESCRIPTION

Figure 1:
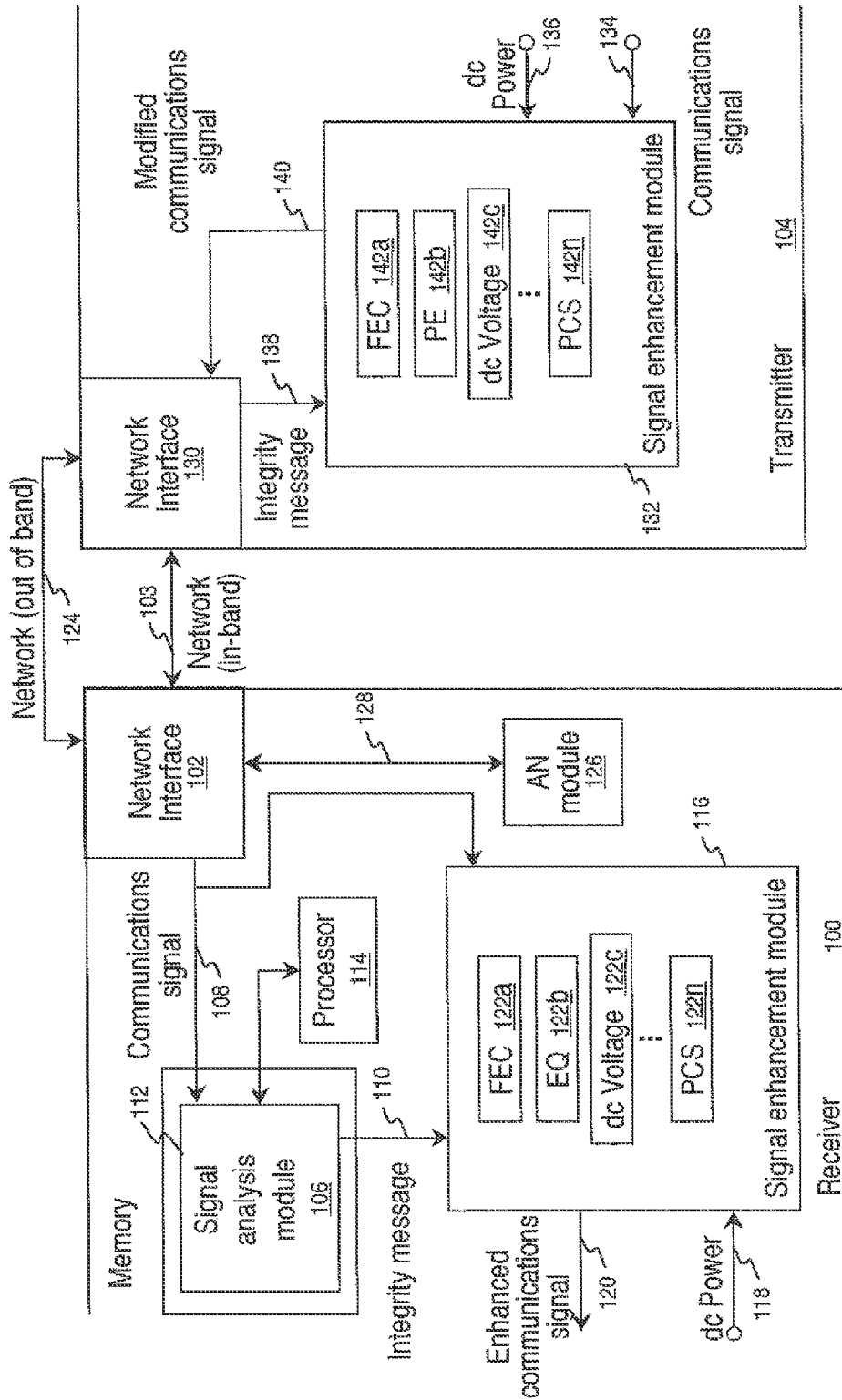
FIG. 1 is a schematic block diagram of a communication device receiver for managing a plurality of signal enhancement mechanisms.

FIG. 1 is a schematic block diagram of a communication device receiver for managing a plurality of signal enhancement mechanisms. The receiver 100 comprises a network interface 102 on line 103 for accepting a communications signal from a transmitter 104. The network 103 may be a Local Area Network (LAN), such as the Ethernet, or an Optical Transport Network (OTN), such as a Synchronous Optical Network (SONET) or in accordance with ITU-T G.709. The receiver is not limited to any particular type of network or protocol.

A signal analysis module 106 has an input on line 108 to accept the communications signal. The signal analysis module 106 analyzes signal integrity and, in response, supplies an integrity message at an output on line 110. In one aspect as shown, the signal analysis module is enabled as a sequence of software instructions that are stored in a tangible memory 112 and executed by a processor 114. Alternatively, the signal analysis module 106 may be enabled in hardware as a state machine type logic module (e.g., a field programmable gate array (FPGA)) or firmware.

As used in this application, the terms "component," "module," "system," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The receiver 100 may employ a computer system with a bus or other communication mechanism for communicating information, and a processor coupled to the bus for processing information. The receiver may also include a main memory, such as a random access memory (RAM) or other dynamic storage device, coupled to the bus for storing information and instructions to be executed by processor. These memories may also be referred to as a computer-readable medium or tangible memory. The execution of the sequences of instructions contained in a computer-readable medium may cause a processor to perform some of the steps associated with signal analysis. Alternately, these functions, or some of these functions may be performed in hardware. The practical implementation of such analysis would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

A signal enhancement module 116 has an input on line 108 to accept the communications signal, an input to accept dc power on line 118, an input to accept the integrity message on line 110, and an output to supply an enhanced communications signal on line 120. The signal enhancement module 116 changes a signal enhancement mechanism 122 and dc power consumption in response to the integrity message. The signal enhancement module 116 may include one or more of the following signal enhancement mechanism types: forward error correction (FEC) 122a, signal equalization (EQ) 122b, dc voltage level 122c, and Physical Coding Sublayer (PCS) 122n. For simplicity, the signal enhancement mechanisms are depicted in parallel. However, it should be understood that a communication signal is typically processed in layers and that physical layer processing, for example, is performed before higher layer processing. The receiver is not necessarily limited to just the above-listed signal enhancement examples.

The signal analysis module 106 analyzes one or more of the following signal characteristics: bit error rate (BER), FEC errors, PCS coding errors, and signal eye opening. For example, FEC errors may include a count of the number of corrections made or the number of uncorrected errors.

In one aspect, the network interface 102 has an input on line 110 to accept the integrity message. The network interface 102 sends the integrity message to the transmitter 104 and receives a modified communications signal responsive to the integrity message. Alternatively, the network interface 102 sends the integrity message via a different, out-of-band network 124. In this scenario, the receiver 100 is more properly referred to as a transceiver, as the network interface 102 has transmit and receive capabilities.

In one aspect, the signal analysis module 106 initially sends the integrity message to the receiver signal enhancement module 116, and subsequently sends to the integrity message to the network interface 102 for transmission to the transmitter 104. Alternatively, the signal analysis module 106 initially sends the integrity message network interface for transmission to the transmitter 104, and subsequently to the receiver signal enhancement module 116. For example, the transmitter 104 initially changes a first type of signal enhancement mechanism, and subsequent to the changing of the transmitter signal enhancement mechanism, the receiver signal enhancement module 116 changes the first type of signal enhancement mechanism. In a more explicit example, the transmitter may engage FEC coding, or change the type of FEC coding, and then the receiver follows suit.

In another example, the transmitter 104 initially changes a first type of signal enhancement mechanism, and subsequent to the changing of the transmitter signal enhancement mechanism, the receiver signal enhancement module 116 changes a second type of signal enhancement mechanism. In a more explicit example, the transmitter may decrease its dc power level and generate a lower power signal, and the receiver may engage signal equalization to aid in recovering the lower power signal, thereby increasing its power consumption.

The decision that changes signal enhancement mechanisms may be made in either the receiver or transmitter, or arrived at through a negotiation process. In one aspect, an auto-negotiation (AN) module 126 is connected to the network interface 102 on line 128 for negotiating signal enhancement modifications with the transmitter. Assuming the devices 100 and 104 are both transceivers, the AN module 126 and an AN module in the transmitter 104 (not shown) may mutually order the transmission of predetermined inquiry signals in the event that a negotiated signal enhancement mechanism has not been determined. Alternatively, the devices 100 and 104 may use a trial-and-error process to select signal enhancement mechanisms. In one aspect, the signal enhancement decisions may be based upon device power limitations. For example, if the receiver is a portable, battery operated device, then power consuming enhancement mechanisms may be enabled in the transmitter.

If the signal enhancement module 116 degrades a signal enhancement mechanism in response to a signal integrity message, the typical result is a reduction in dc power consumption. Alternatively, the signal enhancement module 116 may augment a augment, signal enhancement mechanism, increasing dc power consumption, in response to a signal integrity message. Besides power consumption, microprocessor processing access is another resource whose use is modified in response to signal enhancement changes. For example, the enablement of FEC coding may prevent a supporting communications device from performing other processor-related tasks. Alternatively, the processor speed may need to be increased to support FEC coding, or a second processor enabled, which would necessarily increase power consumption.

The transmitter 104 comprises a network interface 130 for transmitting a modified communications signal to the receiver on line 103 and for accepting an integrity message. The integrity message includes an analysis of the signal integrity of the communications signal, as performed by the receiver 100. More properly, the transmitter 104 may be referred to as a transceiver, as the network interface 130 has transmit and receive capabilities. A signal enhancement module 132 has an input on line 134 to accept a communications signal, an input on line 136 to accept dc power, an input on line 138 to accept the integrity message, and an output on line 140 to supply the modified communications signal. The signal enhancement module 132 changes a signal enhancement mechanism 142 and dc power consumption in response to the integrity message. Some examples of signal enhancement mechanisms include FEC 142a, signal pre-emphasis (PE) 142b, dc voltage level 142c, PCS 142n, and combinations of the above-mentioned characteristics. The transmitter is not necessarily limited to just these examples.

Functional Description

Figure 2:
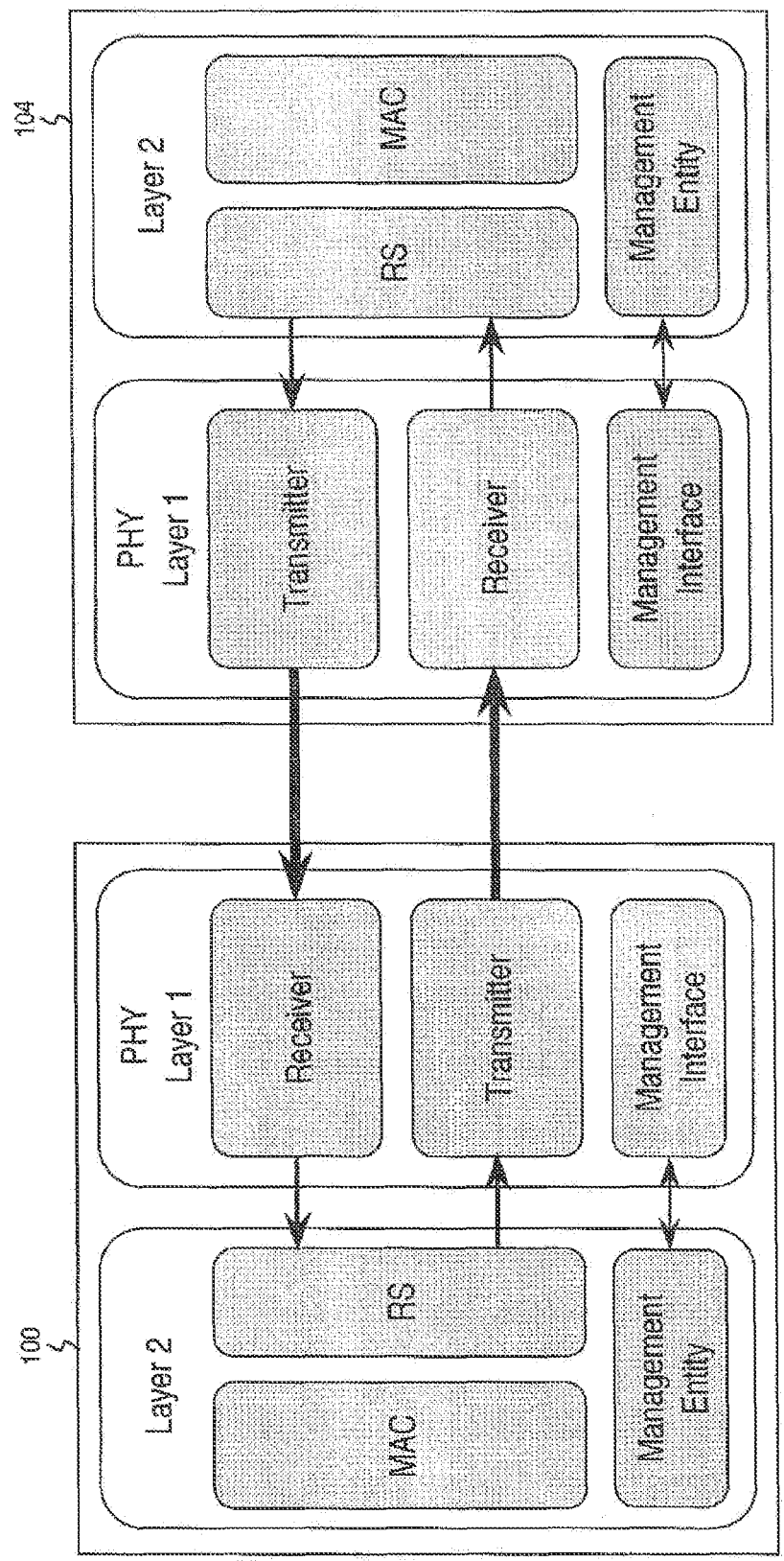
FIG. 2 is a schematic block diagram of the system of FIG. 1, organized in accordance with International Organization for Standardization (ISO) 7-layer Reference Model.

FIG. 2 is a schematic block diagram of the system of FIG. 1, organized in accordance with International Organization for Standardization (ISO) 7-layer Reference Model. 10 G, 40 G, and 100 G Ethernet relies on the use of Sequence Ordered Sets as specified in Clause 46 of IEEE Std. 802.3-2008 and Clause 81 of IEEE Std. 802.3ba-2010. Sequence ordered sets originate and terminate in the reconciliation sublayer (RS) which is in Layer 2. Management entities (e.g., signal analysis and signal enhancement modules) can observe and control PHY behavior and can use Sequence Ordered Sets to transmit and receive information from the link partner's management entity.

In this diagram, it is assumed that the Ethernet sequence ordered sets (per IEEE 802.3 Clause 48) can be used. In one exemplary Sequence Ordered Set, Lane 0 transmits/receives message 0x9C. Lanes 1 and 2 are unused and set to 0x00. Lane 3 contains 0x01 for local fault and 0x02 for remote fault. In 40 G and 100 G, lanes 4-7 are unused and set to 0x00. In this example Lane 1 can be used to pass power backoff requests as follows:

0x00=No change to current settings;
FEC: 0x01=disable, 0x02=enable;
PE/EQ: 0x03=disable, 0x04=enable; and,
O/E Voltage: 0x05=reduce, 0x06=increase.

Requests can be asymmetric (affecting only one transmit/receive path). Other protocols could use their own in-band or out-of-band signaling protocols to communicate between the devices.

Figure 3:
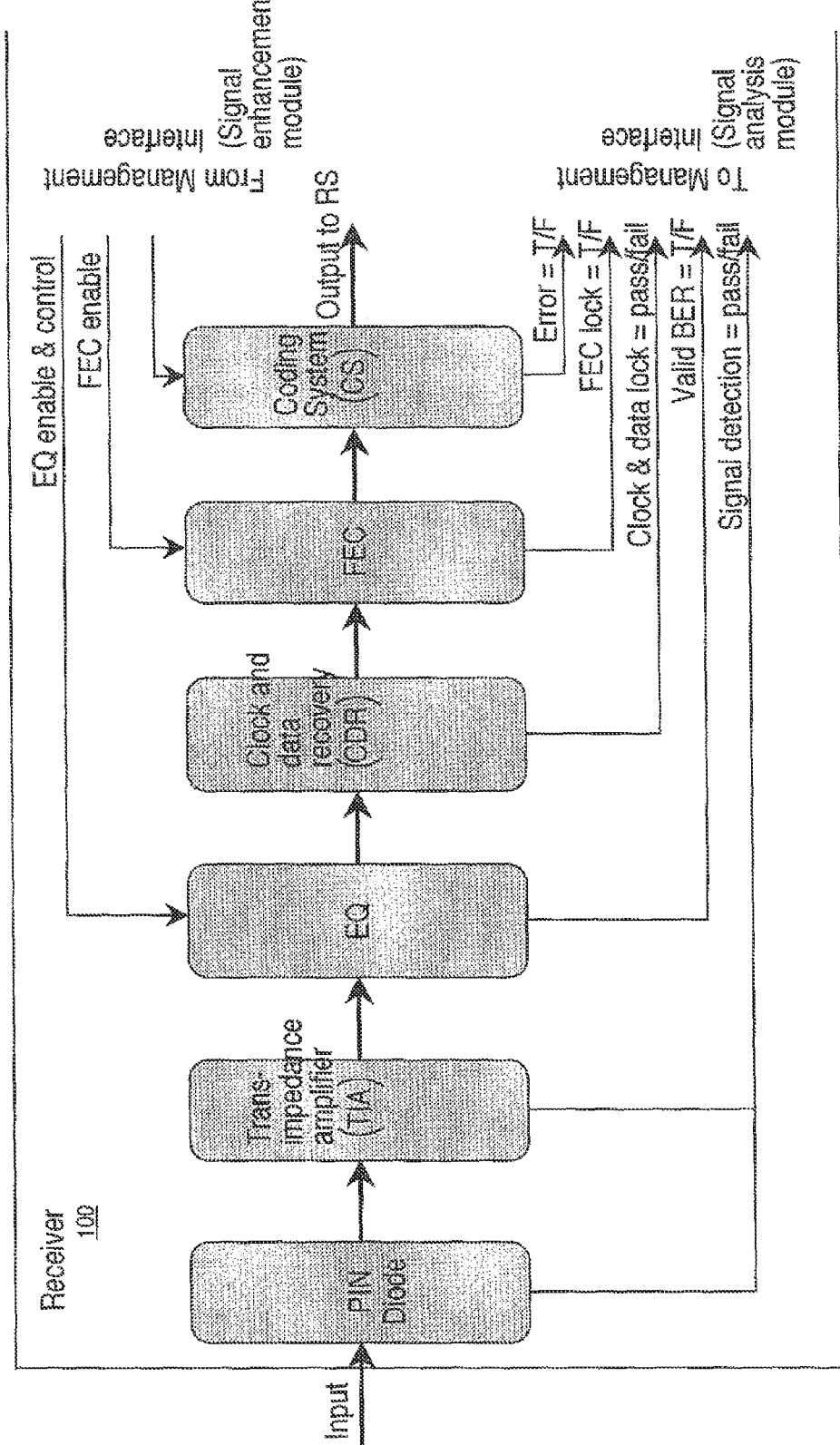
FIG. 3 is a schematic block diagram depicting sequential signal processing in a receiver.

FIG. 3 is a schematic block diagram depicting sequential signal processing in a receiver. There are many circuits along the receive path that convert an optical signal into a digital format. Many of these circuits have criteria for what is considered a pass/fail or valid/error. By monitoring the quality of the signals at multiple points in the receive path, this signal analysis module provides a basis for the selection of circuitry to disable, to reduce power.

Figure 4:
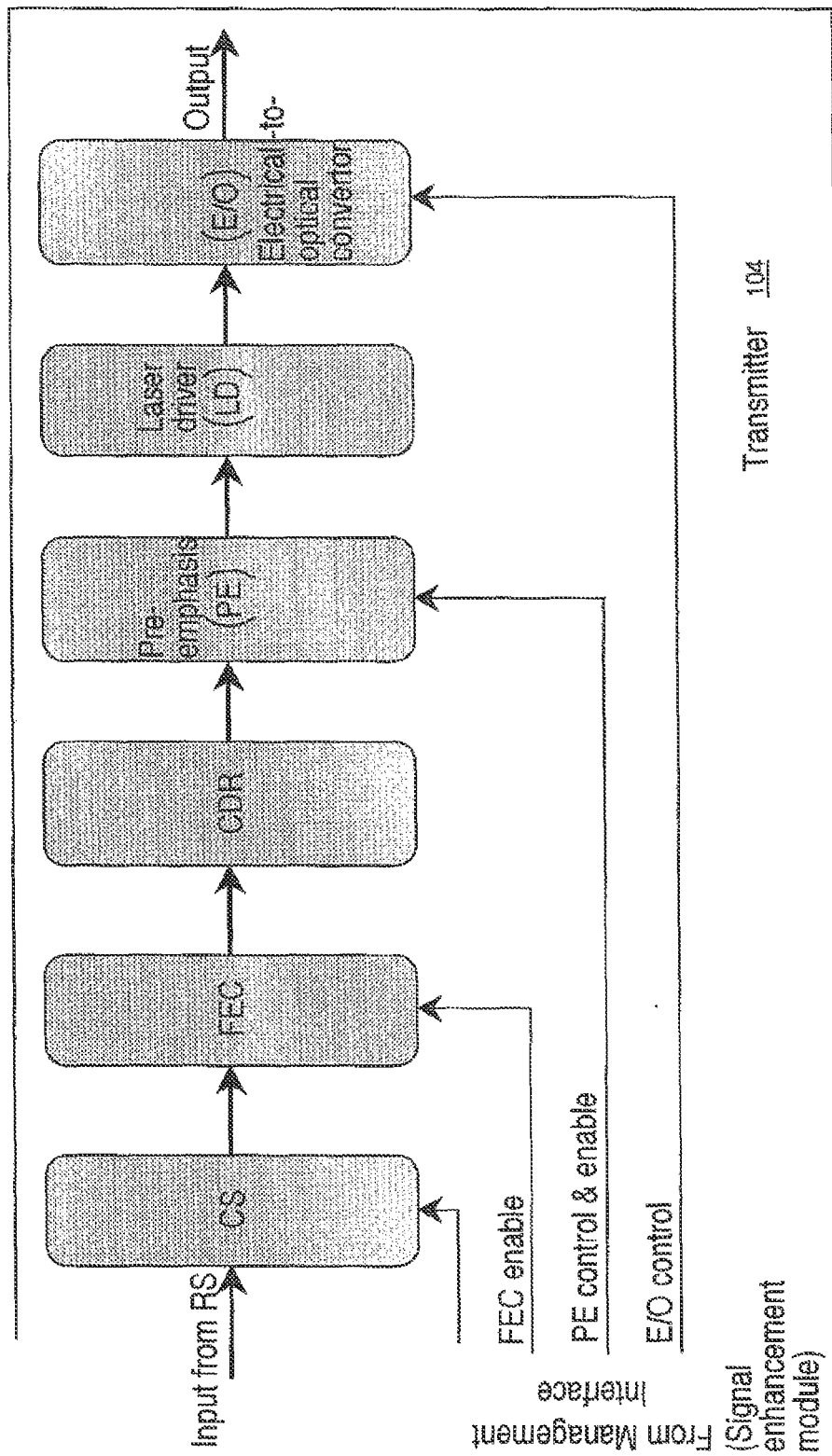
FIG. 4 is a schematic block diagram depicting sequential signal processing in a transmitter.

FIG. 4 is a schematic block diagram depicting sequential signal processing in a transmitter. There are blocks in the transmit path that are required, and others that can be disabled. The pre-emphasis block can have the amount of pre-emphasis controlled, much in the same way as the equalizer can be controlled in the receive path. The optical intensity being provided by the E/O block can be controlled by the voltage that is being provided to the circuitry.

Figure 5:
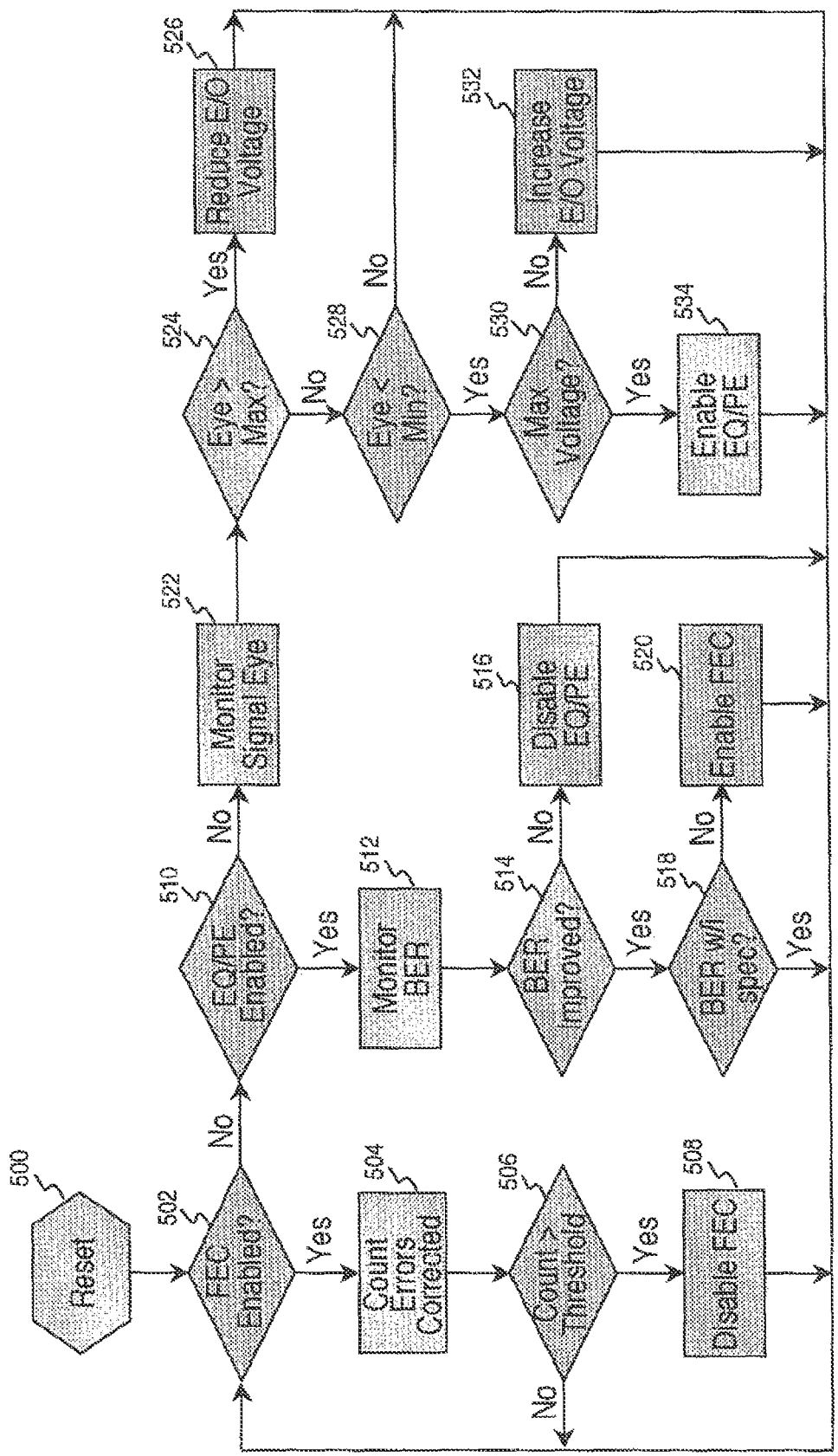
FIG. 5 is a flowchart highlighting how a management entity in either a transmitter or receiver communicates and makes decisions concerning power consumption.

FIG. 5 is a flowchart highlighting how a management entity in either a transmitter or receiver communicates and makes decisions concerning power consumption. The process starts with a reset in Step 500. In Step 502 a determination is made as to whether FEC is enabled. If so, Step 504 calculates errors. In Step 506 a determination is made as to whether the error count is below a threshold. If no, the process returns to Step 502. If yes, Step 508 disables the FEC and returns to Step 502.

If Step 502 determines that FEC is not enabled, then Step 510 determines if EQ is enabled in a receiver, or if pre-emphasis is enabled in a transmitter. If yes, the BER is monitored in Step 512. If Step 514 determines that the BER is improved with respect to a previous measurement, the EQ/PE is disabled in Step 516, and the process returns to Step 502. If the BER is not improved and Step 518 determines that it is within specification, the process returns to Step 502. If the BER is out of spec, Step 520 enables the FEC.

If the EQ/PE is not enabled, Step 522 monitors the eye opening. If Step 524 determines that the eye opening is better than a maximum threshold, Step 526 reduces the dc power supply voltage to the E/O circuitry, and the process returns to Step 502. If Step 528 determines that the eye opening is less than a minimum threshold, the process returns to Step 502. If Step 528 determines that the eye opening is greater than the minimum threshold, Step 530 determines if the dc power level is at a maximum level. If no, the voltage is increased in Step 532. If yes, EQ/PE is enabled in Step 534, and the process returns to Step 502.

Figure 6:
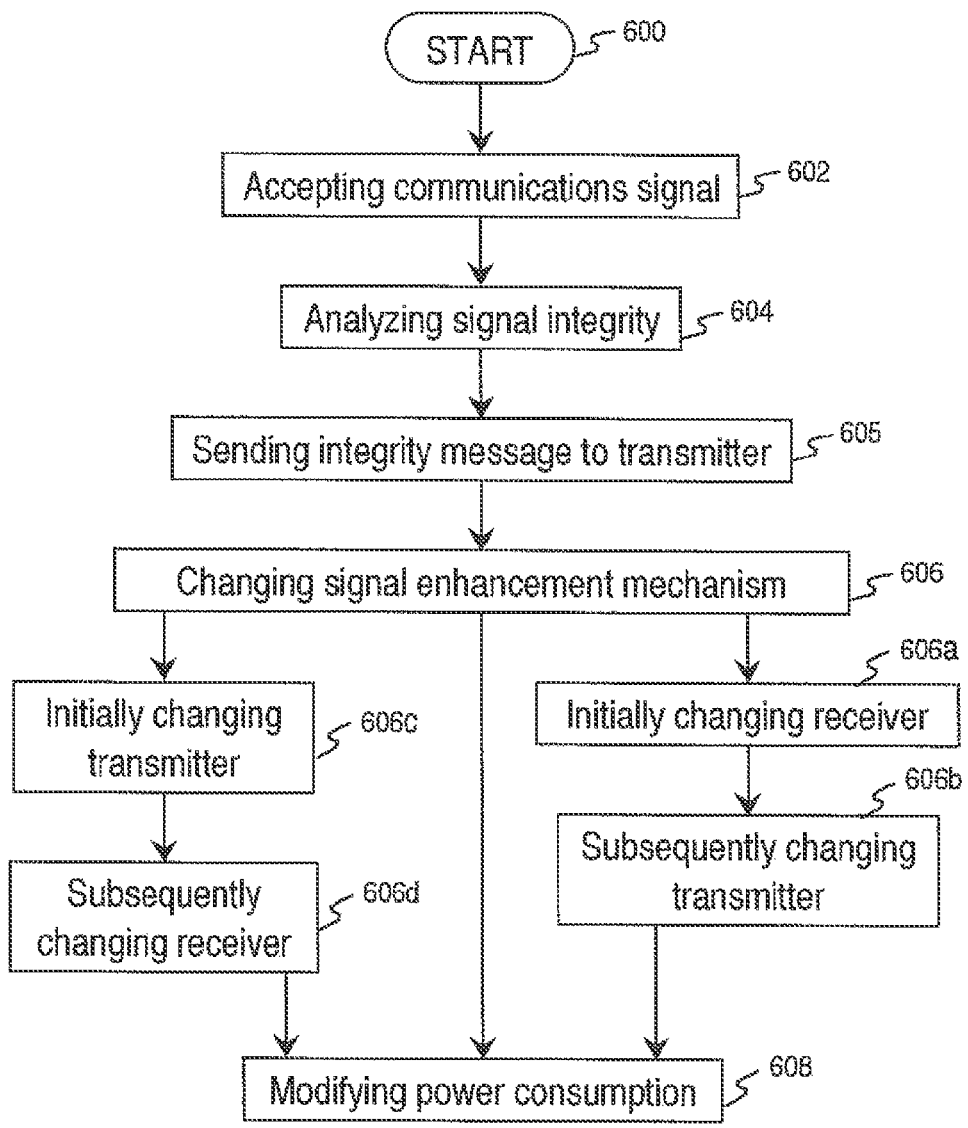
FIG. 6 is a flowchart illustrating a method for managing signal processing power consumption in a communication device using a plurality of signal enhancement mechanisms.

FIG. 6 is a flowchart illustrating a method for managing signal processing power consumption in a communication device using a plurality of signal enhancement mechanisms. Although the method is depicted as a sequence of numbered steps for clarity, the numbering does not necessarily dictate the order of the steps. It should be understood that some of these steps may be skipped. performed in parallel, or performed without the requirement of maintaining a strict order of sequence. Generally, however, the steps are performed in numerical order. The method starts at Step 600.

In Step 602 a receiver accepts a communications signal, and in Step 604 the receiver analyzes signal integrity. For example, Step 604 may analyze signal characteristics such as BER, FEC errors, PCS coding errors, signal eye opening, and combinations of the above-mentioned characteristics. In response to analyzing the signal integrity, Step 606 changes a signal enhancement mechanism. Step 608 modifies device power consumption in response to changing the signal enhancement mechanism. If Step 606 degrades the signal enhancement mechanism, then typically Step 608 decreases power consumption. Alternatively, if Step 606 augments the signal enhancement mechanism, then Step 608 is likely to increase power consumption.

In one aspect, Step 606 changes a receiver signal enhancement mechanism, and Step 608 modifies receiver power consumption. For example, the receiver may change a receiver signal enhancement mechanism type such as FEC, equalization, dc voltage level, PCS, or combinations of the above-mentioned characteristics.

In another aspect, the receiver accepts the communications signal from a transmitter in Step 602, and in Step 605 the receiver transmits the signal integrity analysis to the transmitter. Then, changing the signal enhancement mechanism in Step 606 includes the transmitter changing a transmitter signal enhancement mechanism, and Step 608 modifies transmitter power consumption. For example, the transmitter may change a transmitter signal enhancement mechanism type such as FEC, signal pre-emphasis, PCS, dc voltage level, or combinations of the above-mentioned characteristics.

Both transmitter and receiver signal enhancement mechanisms may be changed in Step 606. For example, in Step 606*a* the receiver may initially change a receiver signal enhancement mechanism. Subsequent to changing the receiver signal enhancement mechanism, the transmitter may change a transmitter signal enhancement mechanism in Step 606*b*. In another example, the receiver may initially change a first type of signal enhancement mechanism (e.g., FEC) in Step 606*a*, and subsequent to changing the receiver signal enhancement mechanism, the transmitter changes the first type of signal enhancement mechanism in Step 606*b*. In a third example, the receiver initially changes a first type of signal enhancement mechanism (e.g., EQ) in Step 606*a*, and subsequent to changing the receiver signal enhancement mechanism, the transmitter changes a second type of signal enhancement mechanism (e.g., dc supply voltage) in Step 606*b*.

Alternatively, in Step 606*c* the transmitter may initially change a transmitter signal enhancement mechanism, and subsequent to changing the transmitter signal enhancement mechanism, the receiver changes a receiver signal enhancement mechanism in Step 606*b*. In one variation, changing the signal enhancement mechanism in Step 606 includes the transmitter and receiver auto-negotiating a signal enhancement mechanism to change.

Figure 7:
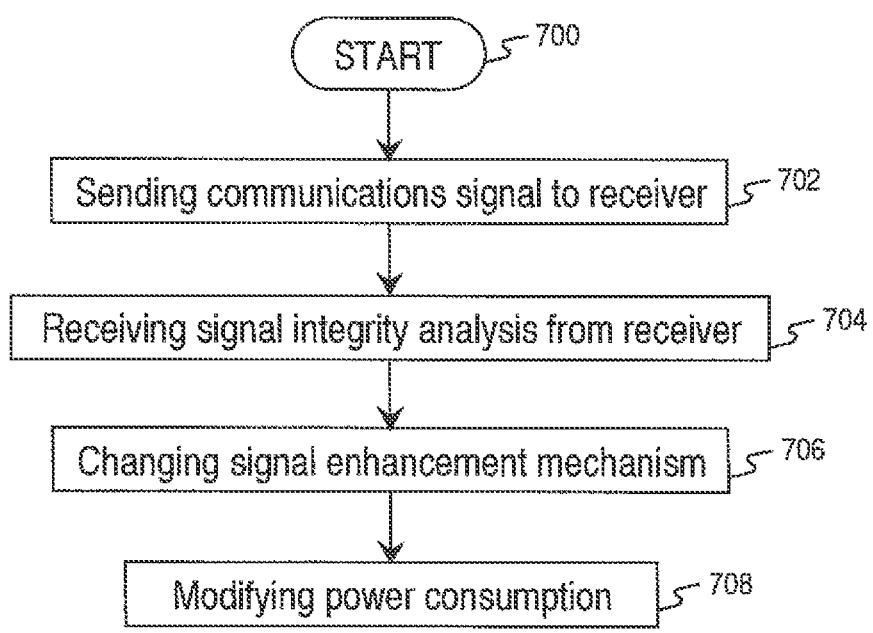
FIG. 7 is a flowchart illustrating a method for managing signal processing power consumption from the perspective of a transmitter communication device using a plurality of signal enhancement mechanisms.

FIG. 7 is a flowchart illustrating a method for managing signal processing power consumption from the perspective of a transmitter communication device using a plurality of signal enhancement mechanisms. The method starts at Step 700.

In Step 702 a transmitter sends a communications signal to a receiver. In Step 704 the transmitter receives a signal integrity analysis from the receiver. In response to the signal integrity analysis, Step 706 changes a signal enhancement mechanism, and Step 708 modifies device power consumption in response to changing the signal enhancement mechanism.

A system and method for managing signal processing power consumption. Examples, of particular circuitry and process flows have been given to illustrate the invention. However, the invention is not limited to merely these examples. Other variations and embodiments of the invention will occur to those skilled in the art.

I claim:

1. In a communication device, a method for managing power consumption, the method comprising:
   a receiver accepting a communications signal from a transmitter, the receiver and the transmitter communicating with each other over a network;

the receiver analyzing signal integrity of the communication signal;
in response to analyzing the signal integrity, changing a receiver signal enhancement mechanism at the receiver;
modifying power consumption at the receiver in response to changing the receiver signal enhancement mechanism; and,
the receiver transmitting the signal integrity analysis to the transmitter; wherein in response to the signal integrity analysis, the transmitter is configured to change a transmitter signal enhancement mechanism and wherein the transmitter is configured to modify power consumption at the transmitter in response to changing the transmitter signal enhancement mechanism; wherein in response to the receiver modifying power consumption at the receiver, the power consumption at the transmitter is modified, and wherein in response to the transmitter modifying power consumption at the transmitter, the power consumption at the receiver is modified.

2. The method of claim 1 wherein the receiver signal enhancement mechanism is selected from a group consisting of forward error correction (FEC), equalization, dc voltage level, physical coding sublayer (PCS), and combinations of the above-mentioned characteristics.

3. The method of claim 1 wherein analyzing signal integrity includes analyzing signal characteristics selected from a group consisting of bit error rate (BER), FEC errors, PCS coding errors, signal eye opening, and combinations of the above-mentioned characteristics.

4. The method of claim 1 wherein the transmitter signal enhancement mechanism is selected from a group consisting of forward error correction (FEC), signal pre-emphasis, PCS, dc voltage level, and combinations of the above-mentioned characteristics.

5. The method of claim 1 wherein changing the receiver signal enhancement mechanism includes the receiver initially changing a first type of signal enhancement mechanism, wherein the transmitter changes a second type of signal enhancement mechanism.

6. The method of claim 1 further comprising the transmitter and receiver auto-negotiating a signal enhancement mechanism to change.

7. In a communication device, a method for managing power consumption, the method comprising:
a transmitter sending a communications signal to a receiver;
the transmitter receiving a signal integrity analysis from the receiver;
in response to the signal integrity analysis, changing a transmitter signal enhancement mechanism at the transmitter; and,
modifying power at the transmitter in response to changing the transmitter signal enhancement mechanism; wherein in response to the transmitter modifying power consumption at the transmitter, the power consumption at the receiver is modified, and wherein if the power consumption at the transmitter is decreased then power consumption at the receiver is increased.

8. A communication device receiver for managing a plurality of signal enhancement mechanisms, the receiver comprising:
a network interface for accepting a communications signal;
a signal analysis module having an input to accept the communications signal, the signal analysis module analyzing signal integrity of the communication signal and, in response, supplying an integrity message at an output to a transmitter; and,
a signal enhancement module having an input to accept the communications signal, an input to accept dc power, an input to accept the integrity message, and an output to supply an enhanced communications signal, the signal enhancement module changing a receiver signal enhancement mechanism at the receiver and dc power consumption at the receiver, in response to the integrity message; wherein in response to the integrity message, the transmitter changes a transmitter signal enhancement mechanism and power consumption at the transmitter is modified; wherein the power consumption at the receiver is increased in combination with decreasing the power consumption at the transmitter, and the power consumption at the receiver is decreased in combination with increasing the power consumption at the transmitter.

9. The receiver of claim 8 wherein the signal enhancement module includes a signal enhancement mechanism type selected from a group consisting of forward error correction (FEC), signal equalization, dc voltage level, Physical Coding Sublayer (PCS), and combinations of the above-mentioned characteristics.

10. The receiver of claim 8 wherein the signal analysis module analyzes signal characteristics selected from a group consisting of bit error rate (BER), FEC errors, PCS coding errors, signal eye opening, and combinations of the above-mentioned characteristics.

11. The receiver of claim 8 wherein the network interface has an input to accept the integrity message, the network interface receiving a modified communications signal from the transmitter responsive to the integrity message.

12. The receiver of claim 11 wherein the signal analysis module initially sends the integrity message to the receiver signal enhancement module, and subsequently sends the integrity message to the network interface for transmission to the transmitter.

13. The receiver of claim 11 wherein the signal analysis module initially sends the integrity message to the network interface for transmission to the transmitter, and subsequently to the receiver signal enhancement module.

14. The receiver of claim 13 wherein the transmitter initially changes a first type of signal enhancement mechanism, and subsequent to the changing of the transmitter signal enhancement mechanism, the receiver signal enhancement module changing the first type of signal enhancement mechanism.

15. The receiver of claim 13 wherein the transmitter initially changes a first type of signal enhancement mechanism, and subsequent to the changing of the transmitter signal enhancement mechanism, the receiver signal enhancement module changing a second type of signal enhancement mechanism.

16. The receiver of claim 11 further comprising:
an auto-negotiation module connected to the network interface for negotiating signal enhancement modifications with the transmitter.

17. The receiver of claim 8 wherein the signal enhancement module degrades a signal enhancement mechanism and reduces dc power consumption in response to a signal integrity message.

18. The receiver of claim 8 wherein the signal enhancement module augments a signal enhancement mechanism and increases dc power consumption in response to a signal integrity message.

19. A communication device transmitter using a plurality of signal enhancement mechanisms, the transmitter comprising:

a network interface for transmitting a modified communications signal to a receiver and accepting an integrity message from the receiver including an analysis of the signal integrity of the enhanced communications signal, as performed by the receiver; and, a signal enhancement module having an input to accept a communications signal, an input to accept dc power, an input to accept the integrity message, and an output to supply the modified communications signal, the signal enhancement module changing a transmitter signal enhancement mechanism at the transmitter and also changing dc power consumption in response to the integrity message; wherein the power consumption at the receiver is increased in response to decreasing the power consumption at the transmitter and wherein the power consumption at the receiver is decreased in response to increasing the power consumption at the transmitter.

20. A communication device receiver for managing a plurality of signal enhancement mechanisms, the receiver comprising:

means for accepting a communications signal from a transmitter;

means for analyzing the communications signal integrity, and in response, supplying an integrity message to the transmitter; and, means for signal enhancement and for accepting the communications signal, dc power, and the integrity message, and supplying an enhanced communications signal, the signal enhancement means changing a receiver signal enhancement mechanism at the receiver and power consumption at the receiver in response to the integrity message; wherein in response to the integrity message, the transmitter changes a transmitter signal enhancement mechanism and power consumption at the transmitter is modified; wherein in response to the transmitter increasing power consumption at the transmitter the power consumption at the receiver is decreased, and in response to the transmitter decreasing power consumption at the transmitter the power consumption at the receiver is increased.

* * * * *